Dec. 31, 1968

SHINICHI SAITO 3,418,973

WATER-TANK FOR REARING FISHES

Filed Nov. 3, 1966

Shinichi Saito,
Inventor

By, Wenderoth, Lind & Ponack
Attys.

United States Patent Office 3,418,973
Patented Dec. 31, 1968

3,418,973
WATER-TANK FOR REARING FISHES
Shinichi Saito, % K. K. Saito-Shozo Shoten, 1–2, 2-chome, Marunouchi, Chiyoda-ku, Tokyo, Japan
Filed Nov. 3, 1966, Ser. No. 591,810
1 Claim. (Cl. 119—3)

ABSTRACT OF THE DISCLOSURE

A water tank for rearing fish. An aquatic habitat chamber is divided from a debris collecting chamber by a perforated horizontal bottom wall, and the debris collecting chamber is divided from a water circulating and mixing chamber by an inclined separator. A discharge pipe extends from the separator through the water circulating and mixing chamber into a filter, and the discharge from the filter is connected to a water circulating pipe for circulating water in the water circulating and mixing chamber. An air compressor discharges air into the circulating pipe. A return pipe extends from the separator through the debris chamber and into the aquatic habitat chamber for returning filtered and aerated water thereto.

---

The present invention relates to a water-tank, and more particularly to a water-tank for rearing together a number of fishes, shellfishes and other aquatic, limnetic or marine animals, in similar conditions to those in which they live and grow naturally, which water-tank can be displayed beautifully for appreciative spectators in such a location as an aquarium.

Heretofore, attention has been concentrated on how to keep the water in the tank pure in water-tanks used for such purposes. For this reason the most of the conventional water-tanks are so constructed that the water is circulated at all times in the tank in order that the water is maintained pure by means of a filtering device.

In such tanks, a filter is employed which is either attached thereto within the tank or provided outside of the tank. Whichever arrangement is used, the conventional water-tanks purify dirty water in the tank tolerably but are not able to remove the materials which are the cause of the dirty water from the tanks.

Fishes will produce in the tank innumerable dirty matters such as physiological refuse from themselves, scales which have been shed, residual feed, and the like. Tanks can not be fully purified satisfactorily however much fresh water is supplied thereto if such impurities are still present in the tanks.

Furthermore, the dirty materials float in the conventional water-tanks due to the lack of disposal means so that the living things which are being reared in the tanks are unfavorably affected.

The object of this invention is to furnish a water-tank having a water circulation device and means for removing the impurities derived from fishes, shellfishes and other aquatic animals being reared in the water-tank, or the dirty water containing such impurities from the tank and passing the water through a filtering means so as to purify the water, and means for maintaining the temperature thereof at a temperature which is habitable, for the fishes, shellfishes or the like.

Figure 1:
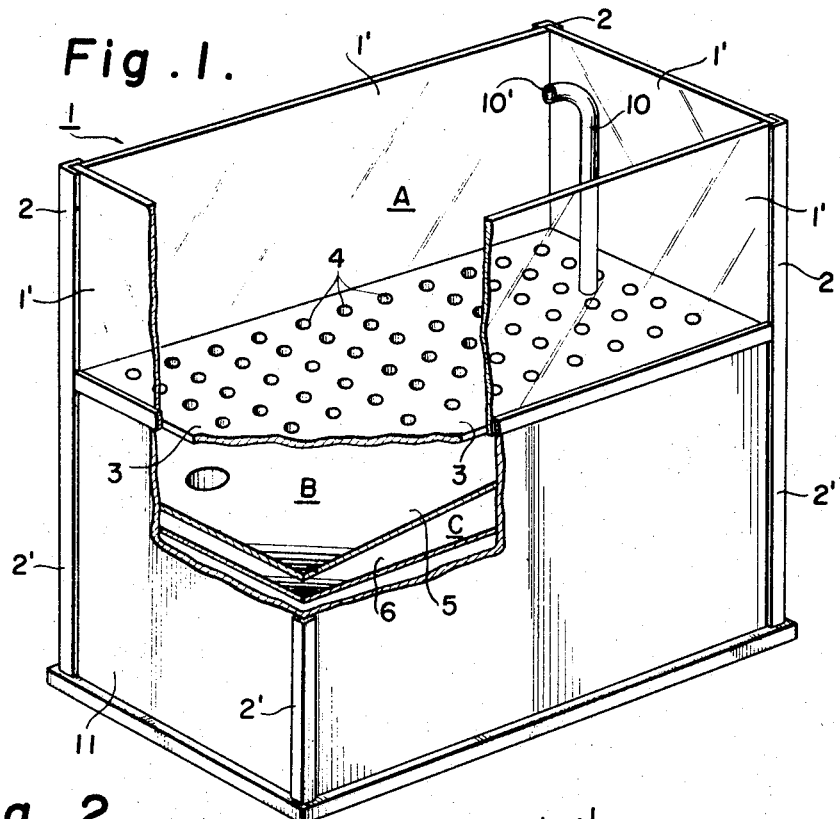
Figure 2:
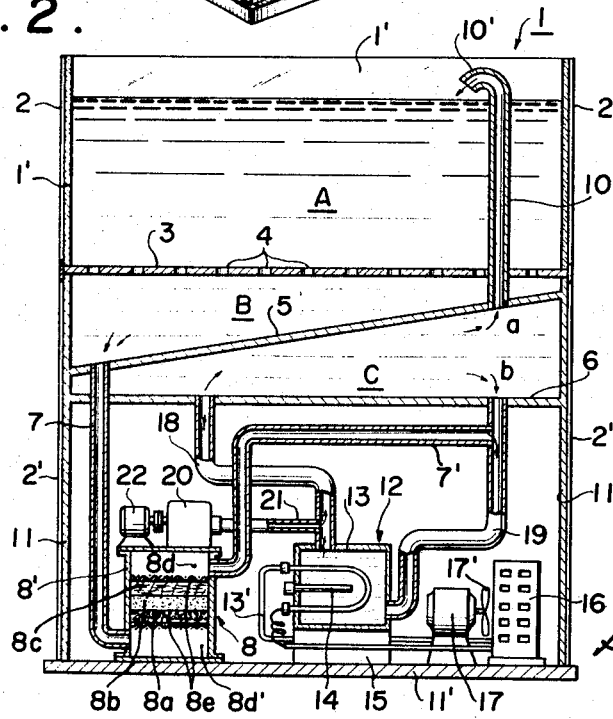

Other objects and advantages of the present invention will become apparent from the following description of a preferred embodiment of the invention taken in connection with the appended drawings in which:

FIG. 1 is a perspective, partially cut away view showing the construction of the bottom part of a water-tank according to the invention; and FIG. 2 is a sectional elevation view of the tank of FIG. 1.

As is shown in the drawings, the water-tank for rearing fishes according to this invention comprises a tank body for holding a body of water for rearing the fishes; a means positioned outside thereof for filtering the impurities and dirty water in the tank; and a circulation circuit for passing the filtered clean water through a heat-exchanger so as to regulate the temperature to a desirable temperature for the fishes, and then to return it to the said water-tank.

The water-tank as shown in FIGURES 1 and 2, which shows a preferred embodiment of this invention, has a water-tank body 1 having an oblong shape, the upper side of which is open and the four sides of which are composed of transparent material such as, for example, glass sheets 1' through which the interior is visible from the outside.

The water-tank body 1 is supported by metal frame members 2 provided for reinforcing at the four outer corners, being secured to the sides with an adhesive or the like.

A bottom plate 3 positioned horizontally on the bottom of the said tank body 1 has a plurality of holes 4 therethrough, which can be arranged in a regular or irregular pattern, and which are large enough to freely pass fine particles of refuse such as the excretion of fishes, scales therefrom, or residual particles of feed, but not large enough to pass pebbles or rocks (not shown in the drawings) laid on the bottom plate.

Said tank body 1 has underneath the bottom plate 3 an imperforate separator 5, which is longitudinally inclined so that one end thereof is higher than the other. There is further provided underneath the inclined separator 5 a horizontal bottom partition 6.

Said water-tank 1 is thus divided into three compartments as shown in FIG. 2 by the three plate members, bottom plate 3, separator 5 and bottom partition 6, forming an aquatic habitat chamber A, a debris collecting chamber B, and a water circulating and mixing chamber C.

Said separator 5 has a pipe 7 opening through the lower part thereof and extending through the chamber C, the end of said pipe opening upwardly into the chamber B.

Said pipe 7 extends through the bottom partition 6 and is connected with the bottom of a filter 8. A pipe 7' extends from the upper part of the filter 8 and is connected intermediate the ends of a circulation pipe 19, the upper end of which opens through the bottom partition 6 into chamber C.

At the higher end of said separator 5 is a pipe 10 for discharging clean water. Said pipe 10 extends upwardly through the bottom plate 3 and enters the chamber A of the tank body 1, the upper part 10' of said pipe 10 being bent over toward the interior of the chamber and being adapted to end close to, or slightly higher than, the water level in the tank body 1. The lower end of this pipe 10 opens downwardly through separator 5 and places chamber C in communication with chamber A.

Said tank body 1 has a box-like case 11 beneath it which is shaped similar to said tank body and is composed of stainless steel, plastic, wood or the like, the four corners of said case 11 being secured with an adhesive or the like to the extended portions 2' of the reinforcing metal frame members 2 provided at the corners of said tank body 1.

As is shown in FIG. 2, there are arranged in the interior of said case 11 a circuit means for water circulation composed of pipe members, a heat exchanger incorporated in said means, and an air compressor, respectively. The heat exchanger 12 is mounted on the bottom plate 11' of the case 11 and maintains the water in the tank at a temperature most favorable for the habitation of fishes and shellfishes. Said heat exchanger 12 is conventional and well-known to those skilled in the art. The heat exchanger 12 of illustrated embodiment has a housing 13 of any desired form though water can freely run. The interior of said housing 13 has a coiled pipe 13′ for circulating a refrigerant and a known heater device 14 for heating when an electric current is supplied thereto from a power source. Said pipe 13′ is forcedly charged with a known refrigerant, such as Freon, from a tank 15, said pipe 13′ being connected to a radiator 16, which is cooled by a fan 17′ connected with the shaft of a motor 17.

In order that the water in the tank may be warmed or cooled automatically by means of said heat exchanger, a thermostat (not shown in the drawings) for sensing the water temperature can be mounted in the chamber A of the tank body 1.

Said heat exchanger 12 and the chamber C of said tank body 1 are connected with each other through a larger pipe 18, and the lower end of pipe 19 is also connected to said heat exchanger 12, the two pipes 18 and 19 constituting a circulation circuit for circulating the water through the heat exchanger 12.

It is preferable that the two pipes 18 and 19 be spaced from each other in the chamber C, and it is also preferred that pipe 19 be positioned right underneath the pipe 10 connected to the separator 5.

This arrangement will be advantageous because the water circulation is in the chamber C and this arrangement will serve to cause the water flow to be divided into two currents, one having up and the other down.

The filter 8 has a housing 8′ and well-known conventional filtering materials such as, for example, gravel 8a, sand 8b, fiber 8c, etc., are laid in layers therein, and these materials are held in place by metal mesh plates 8e above and below the filtering materials, the interior of said housing 8′ having spaces 8d and 8d′ in the upper and lower parts thereof. Such a filter is conventional and well-known to those in the art.

The intermediate part of the pipe 18 connected with the heat exchanger 12 has connected thereto one end of a pipe 21 which has the other end connected to an air compressor 20 driven by a motor 22. The compressed air from said air compressor 20 is continuously forced into the pipe 18, in which air bubbles are produced so as to push the water in the pipe 18 upward so that said compressed air serves to circulate the water.

During the operation of the water-tank, there are fishes floating or swimming at all times in chamber A of the tank body 1. The dirt particles produced thereby will fall down through the water by themselves because of their own weight and accumulate on the bottom plate 3. Because said bottom plate 3 has numerous holes 4, said dirt particles and dirty water will flow down into the chamber B. The bottom of said chamber B being formed by the separator 5, the impurities and the like which have flowed into said chamber B will gradually gather toward the lower part thereof, and enter the filter 8 through the pipe 7. Said impurities will then be removed by the filtering materials in the interior of the filter 8, and the dirty water will be cleaned. The resultant clean water will flow through pipe 7′ with the water in the circulation pipe 19 and will enter the heat exchanger 12. Thus the water is warmed or cooled by said heat exchanger 12 so that it reaches a temperature most desirable for the fishes. Thereafter the water will be discharged into the circulation pipe 18, and will be pumped by the compressed air being pumped into the pipe 18 by the air compressor 20. Thus the water current will move upward, and eventually be discharged into the chamber C.

The clean water discharged into the chamber C will thereupon be separated into two streams indicated by the arrows a and b, one of which returns to the water-tank A by way of the pipe 10 connected directly to the interior of the tank A, while the other indicated by the arrow b enters the lower pipe 19, thus joining the water from the filter 8 to again be sent into the heat exchanger 12.

What is claimed is:
1. A water tank for rearing fishes comprising an aquatic habitat chamber having side walls of transparent material and a horizontal bottom plate having a plurality of holes therein, a debris collecting chamber the upper wall of which is said bottom plate, a separator which is inclined longitudinally from the one side to the other of said water tank and forming the bottom of said debris collecting chamber, a water circulating and mixing chamber beneath said debris collecting chamber the upper wall of which is defined by said separator, a bottom partition forming the bottom of said water circulating and mixing chamber, a filter and an air compressor beneath said bottom partition, a discharge pipe opening upwardly through the lower end of said separator and having the other end connected to one side of the filter, a return pipe extending upwardly from the higher end of said separator through the bottom plate into the chamber for returning clean water from said water circulating and mixing chamber to said aquatic habitat chamber, a circulation pipe communicating with the water circulating and mixing chamber, said air compressor being connected to said circulation pipe near one end thereof, and a filter discharge pipe connected to the other side of the filter and to the circulation pipe near the other end thereof.

References Cited
UNITED STATES PATENTS

| | | | |
|---|---|---|---|
| 2,253,516 | 8/1941 | Haldeman | 119—5 |
| 2,302,336 | 11/1942 | Macdonald | 119—2 |
| 2,594,474 | 4/1952 | McGrath | 119—3 X |
| 2,672,845 | 3/1954 | Schneithorst | 119—3 |
| 2,696,800 | 12/1954 | Rork | 119—5 |
| 2,981,228 | 4/1961 | Brandano | 119—2 |
| 3,232,271 | 2/1966 | De Jose et al. | 119—5 |

ALDRICH F. MEDBERY, Primary Examiner.

U.S. Cl. X.R.
119—2, 5